US012608471B2

(12) United States Patent
Kumar et al.

(10) Patent No.: US 12,608,471 B2
(45) Date of Patent: Apr. 21, 2026

(54) GENERATING AND DEPLOYING PHISHING TEMPLATES

(71) Applicant: Capital One Services, LLC, McLean, VA (US)

(72) Inventors: Lokesh Vijay Kumar, Frisco, TX (US); Poornima Bagare Raju, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 201 days.

(21) Appl. No.: 18/344,733

(22) Filed: Jun. 29, 2023

(65) Prior Publication Data

US 2025/0005150 A1     Jan. 2, 2025

(51) Int. Cl.
G06F 21/00          (2013.01)
G06F 21/56          (2013.01)

(52) U.S. Cl.
CPC .................................... G06F 21/56 (2013.01)

(58) Field of Classification Search
CPC ....................................................... G06F 21/56
See application file for complete search history.

(56) References Cited

U.S. PATENT DOCUMENTS

| | | | |
|---|---|---|---|
| 8,484,741 B1 | 7/2013 | Chapman | |
| 8,719,940 B1 * | 5/2014 | Higbee ............... | H04L 63/1483 |
| | | | 709/206 |
| 9,223,971 B1 * | 12/2015 | Bartolomie ........... | H04L 51/212 |

| | | | |
|---|---|---|---|
| 9,742,803 B1 * | 8/2017 | Kras ....................... | G06F 21/56 |
| 9,749,359 B2 * | 8/2017 | Gatti ................... | H04L 63/1483 |
| 10,165,006 B2 | 12/2018 | Irimie et al. | |
| 10,764,317 B2 | 9/2020 | Irimie et al. | |
| 11,128,649 B1 * | 9/2021 | Yeh ..................... | H04L 63/1483 |
| 11,140,191 B2 | 10/2021 | Oberheide | |
| 11,563,767 B1 * | 1/2023 | Rodriguez .......... | H04L 63/1433 |
| 11,663,353 B1 * | 5/2023 | Wilkinson ............. | G06F 21/44 |
| | | | 726/17 |
| 11,757,914 B1 * | 9/2023 | Jakobsson ............... | H04L 51/42 |
| | | | 726/25 |
| 11,928,212 B2 * | 3/2024 | McClay ............. | H04L 63/1483 |

(Continued)

OTHER PUBLICATIONS

Dhruvalkumar Patel, "Test Utility for Live and Online Testing of an Anti-Phishing Message Security System" (2018), Master's Thesis, 41 pages, University of Victoria.

*Primary Examiner* — Don G Zhao
(74) *Attorney, Agent, or Firm* — Harrity & Harrity, LLP

(57)               ABSTRACT

In some implementations, a phishing test engine may receive a set of email messages that are associated with a set of users and with an indication of legitimacy. The phishing test engine may perform clustering on the set of email messages to identify a subset of similar email messages and a subset of users. The phishing test engine may generate an email template based on the subset of similar email messages and including an indicator of phishing. The phishing test engine may generate, from the email template, a test email message addressed to a user in the subset of users and may transmit the test email message to the user. The phishing test engine may receive an indication of an interaction with the test email message and may update a policy associated with the set of users based on the indication of the one or more interactions.

20 Claims, 11 Drawing Sheets

500

510 — Receive a set of email messages that are associated with a set of users

520 — Perform clustering on the set of email messages to identify a subset of similar email messages from the set of email messages and a subset of users from the set of users that are associated with the subset of similar email messages 530 — Generate, for the subset of users, an email template based on the subset of similar email messages 540 — Incorporate, into the email template, at least one indicator of phishing 550 — Generate, from the email template, a test email message addressed to at least one user in the subset of users and based on at least one email message in the subset of similar email messages 560 — Transmit the test email message to the at least one user 570 — Receive an indication of one or more interactions with the test email message 580 — Transmit a report based on the indication of the one or more interactions

(56) References Cited

U.S. PATENT DOCUMENTS

| | | | |
|---|---|---|---|
| 2013/0031628 A1* | 1/2013 | Wang | G06F 21/56 |
| | | | 726/22 |
| 2014/0020047 A1* | 1/2014 | Liebmann | H04L 63/0227 |
| | | | 726/1 |
| 2014/0120961 A1* | 5/2014 | Buck | G06F 1/329 |
| | | | 455/466 |
| 2016/0308897 A1 | 10/2016 | Chapman | |
| 2018/0159888 A1* | 6/2018 | Irimie | H04W 12/122 |
| 2019/0005428 A1* | 1/2019 | Kras | G06Q 10/06314 |
| 2020/0135049 A1* | 4/2020 | Atencio | G09B 19/0053 |
| 2021/0075827 A1* | 3/2021 | Grealish | H04L 63/1483 |
| 2021/0152596 A1* | 5/2021 | Hemingway | H04L 63/1483 |
| 2021/0185080 A1* | 6/2021 | Wang | G06N 3/044 |
| 2021/0248229 A1* | 8/2021 | Kras | H04L 51/08 |
| 2022/0006830 A1* | 1/2022 | Wescoe | G06N 20/00 |
| 2022/0116419 A1* | 4/2022 | Kelm | H04L 63/1483 |
| 2022/0279015 A1* | 9/2022 | Sambamoorthy | H04L 51/212 |
| 2022/0400134 A1* | 12/2022 | Chen Kaidi | G06V 30/19 |
| 2023/0214925 A1* | 7/2023 | Cella | G06Q 30/06 |
| | | | 705/37 |
| 2024/0064063 A1* | 2/2024 | Hall | G06F 18/21 |
| 2024/0176879 A1* | 5/2024 | McClay | H04L 63/1483 |
| 2025/0005150 A1* | 1/2025 | Kumar | G06F 21/56 |

* cited by examiner

100

115
Perform clustering

Phishing
test
engine

105
Request for legitimate email
messages

110
Set of legitimate email
messages

Email
server

140
Populate template

Phishing
test
engine

130
Request for template for user
group

135
Requested template

Template
database

100

100

145
Test email messages

150
Interactions with test email messages

Phishing test engine

User devices

100

165a
Report

165c
Updated policy

165b
Report

Phishing
test
engine

User
devices

Network
device

Administrator
device

500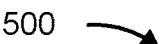

510 — Receive a set of email messages that are associated with a set of users

520 — Perform clustering on the set of email messages to identify a subset of similar email messages from the set of email messages and a subset of users from the set of users that are associated with the subset of similar email messages 530 — Generate, for the subset of users, an email template based on the subset of similar email messages 540 — Incorporate, into the email template, at least one indicator of phishing 550 — Generate, from the email template, a test email message addressed to at least one user in the subset of users and based on at least one email message in the subset of similar email messages 560 — Transmit the test email message to the at least one user 570 — Receive an indication of one or more interactions with the test email message 580 — Transmit a report based on the indication of the one or more interactions

FIG. 5

GENERATING AND DEPLOYING PHISHING TEMPLATES

BACKGROUND

One common form of computer attack is a phishing attempt. A phishing attempt includes a communication, sent to a user, that uses impersonation (or another form of trickery or deception) to entice the user to provide a set of credentials to an attacker.

SUMMARY

Some implementations described herein relate to a system for generating and deploying phishing templates. The system may include one or more memories and one or more processors communicatively coupled to the one or more memories. The one or more processors may be configured to receive a set of email messages that are associated with a set of users and that are associated with an indication of legitimacy. The one or more processors may be configured to perform clustering on the set of email messages to identify a subset of similar email messages from the set of email messages and a subset of users from the set of users that are associated with the subset of similar email messages. The one or more processors may be configured to generate, for the subset of users, an email template based on the subset of similar email messages. The one or more processors may be configured to incorporate, into the email template, at least one indicator of phishing. The one or more processors may be configured to generate, from the email template, a test email message addressed to at least one user in the subset of users and based on at least one email message in the subset of similar email messages. The one or more processors may be configured to transmit the test email message to the at least one user. The one or more processors may be configured to receive an indication of one or more interactions with the test email message. The one or more processors may be configured to transmit a report based on the indication of the one or more interactions.

Some implementations described herein relate to a method of generating and deploying phishing templates. The method may include receiving a set of email messages that are associated with a set of users. The method may include performing clustering on the set of email messages to identify a subset of similar email messages from the set of email messages and a subset of users from the set of users that are associated with the subset of similar email messages. The method may include generating, for the subset of users, an email template based on the subset of similar email messages. The method may include incorporating, into the email template, at least one indicator of phishing. The method may include generating, from the email template, a test email message addressed to at least one user in the subset of users. The method may include transmitting the test email message to the at least one user. The method may include receiving an indication of one or more interactions with the test email message. The method may include updating a policy associated with the set of users based on the indication of the one or more interactions.

Some implementations described herein relate to a non-transitory computer-readable medium that stores a set of instructions for generating and deploying phishing templates. The set of instructions, when executed by one or more processors of a device, may cause the device to receive an email template, associated with a set of users, that was generated based on a set of email messages associated with an indication of legitimacy and that includes at least one indicator of phishing. The set of instructions, when executed by one or more processors of the device, may cause the device to generate, from the email template, a test email message addressed to at least one user in the set of users. The set of instructions, when executed by one or more processors of the device, may cause the device to transmit the test email message to the at least one user. The set of instructions, when executed by one or more processors of the device, may cause the device to receive an indication of one or more interactions with the test email message. The set of instructions, when executed by one or more processors of the device, may cause the device to transmit a report based on the indication of the one or more interactions.

BRIEF DESCRIPTION OF THE DRAWINGS

FIG. 5 is a flowchart of an example process relating to generating and deploying phishing templates, in accordance with some embodiments of the present disclosure.

DETAILED DESCRIPTION

The following detailed description of example implementations refers to the accompanying drawings. The same reference numbers in different drawings may identify the same or similar elements.

In a phishing attempt, an attacker transmits a communication, to a user, that uses impersonation (or another form of trickery or deception) to entice the user to voluntarily provide a set of credentials, associated with the user, to the attacker. For example, the attacker may send an email message impersonating a bank, an insurance company, a merchant, or another legitimate actor and include a hyperlink. The user may follow the hyperlink and provide the set of credentials to the attacker via a website that impersonates the legitimate actor's website. Successful phishing attacks can result in significant downtime (e.g., by enabling a denial-of-service (DOS) attack). Additionally, remediation of successful phishing attacks consumes significant power and processing resources in order to modify the user's set of credentials and to undo actions performed by the attacker with the user's previous set of credentials.

In order to reduce successful phishing attacks, administrators may deploy phishing tests to educate users and to evaluate risks. Test phishing email messages may be generated using a database of extant phishing email messages (e.g., based on reports from users). However, the database consumes significant memory overhead. Additionally, using extant phishing email messages results in test phishing email messages that are generic, which reduces an educational value of the test phishing email messages. Therefore, chances of successful phishing attacks remain high, which may result in significant downtime as well as cost power and processing resources, as described above.

Some implementations described herein enable generating phishing templates based on legitimate email messages. As a result, memory overhead is conserved as compared with using a database of extant phishing email messages. Additionally, by customizing test email messages using the legitimate email messages, an educational value of the test phishing email messages is increased. Therefore, chances of successful phishing attacks are reduced, which conserves power and processing resources that would otherwise be expended on remediating the successful phishing attacks. In some implementations, a policy (e.g., associated with an intranet and/or another network) may be automatically updated based on results from the test phishing email messages, which may further reduce chances of successful phishing attacks.

FIGS. 1A-1F are diagrams of an example 100 associated with generating and deploying phishing templates. As shown in FIGS. 1A-1F, example 100 includes an email server, a phishing test engine, a template database, user devices (e.g., one or more user devices), a network device, and an administrator device. These devices are described in more detail in connection with FIGS. 3 and 4.

Figure 1A:
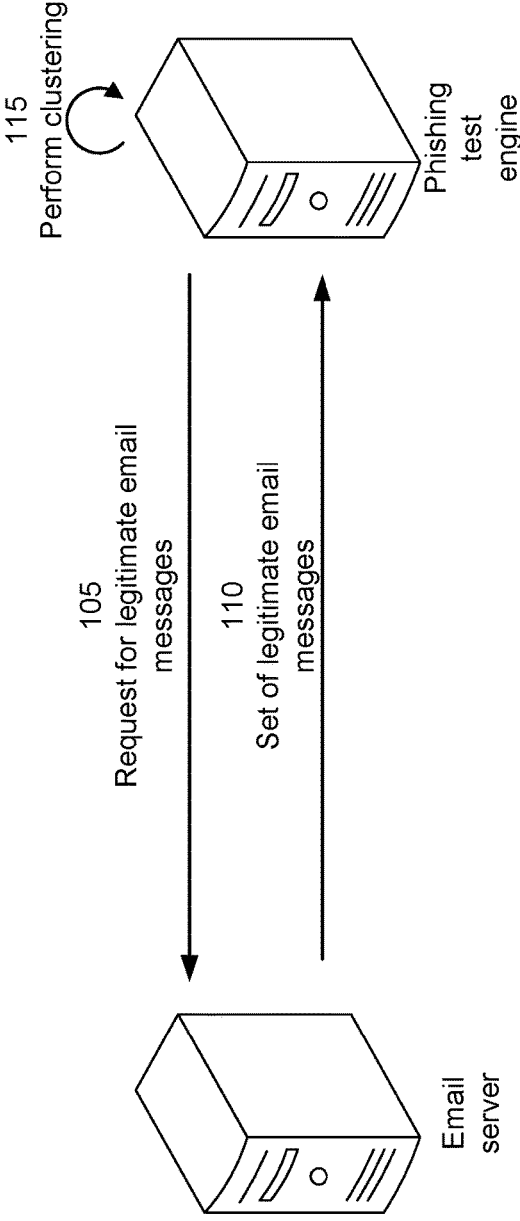
FIGS. 1A-1F are diagrams of an example implementation relating to generating and deploying phishing templates, in accordance with some embodiments of the present disclosure.

As shown in FIG. 1A and by reference number 105, the phishing test engine may transmit, and the email server may receive, a request for a set of email messages. In some implementations, the request may include an indication (e.g., a bit or a field, among other examples) that the set of email messages should be legitimate. The request may include a hypertext transfer protocol (HTTP) request and/or an application programming interface (API) call, among other examples. For example, an administrator associated with the phishing test engine may provide input (e.g., via an input component) that triggers the phishing test engine to transmit the request. Additionally, or alternatively, the phishing test engine may transmit the request periodically (e.g., according to a schedule).

In some implementations, the phishing test engine may authenticate itself with the email server. For example, the phishing test engine may provide a set of credentials (e.g., a token, a certificate, a key, and/or a username and password, among other examples) with the request or prior to the request. Therefore, the email server may verify the set of credentials before providing the set of email messages, as described below.

As shown by reference number 110, the email server may transmit, and the phishing test engine may receive, the set of email messages. The set of email messages may be associated with an indication of legitimacy. For example, the set of email messages may lack a spam indicator (and/or reside outside spam folders, such as in inboxes or archives). Additionally, or alternatively, the set of email messages may lack a junk indicator (and/or reside outside junk folders, such as in inboxes or archives). The set of email messages may be included in an HTTP response to an HTTP request from the phishing test engine and/or returned in response to an API call from the phishing test engine. In some implementations, the email server may use a combination of legitimate email messages (e.g., associated with the indication of legitimacy) and illegitimate email messages (e.g., unassociated with the indication of legitimacy).

The set of email messages may be associated with a set of users. For example, the set of email messages may be addressed to email addresses associated with the set of users and/or may be stored in inboxes (or archives) associated with the set of users. In some implementations, the email server may provision the email addresses and the inboxes on behalf of an organization including the set of users. Accordingly, the phishing test engine may additionally be associated with the organization such that the phishing test engine is authorized to access the set of email messages from the inboxes (or archives) associated with the set of users. Other examples may include the phishing test engine obtaining a set of email messages associated with a single user (e.g., from an email server provisioning an email address and inbox for personal use of the single user).

As shown by reference number 115, the phishing test engine may perform clustering on the set of email messages. Accordingly, the phishing test engine may identify a subset of email messages, from the set of email messages, that are similar (also referred to as a "subset of similar email messages"). By clustering the set of email messages to identify the subset of email messages, the phishing test engine may also identify a subset of users, from the set of users, that are associated with the subset of email messages (e.g., because email addresses associated with the subset of users are included in a "from" line or a "to" line of the subset of email messages).

In some implementations, the phishing test engine may perform clustering using a machine learning algorithm (e.g., similarly as described in connection with FIG. 2B). For example, the phishing test engine may apply the machine learning algorithm to map the set of email messages to a plurality of clusters based on linguistic similarities. Therefore, matching words and/or phrases (e.g., identifying identical strings or identifying strings with a matching proportion of characters that satisfies a matching threshold) in subject lines and/or bodies of email messages may result in the email messages being mapped to a same cluster. Additionally, or alternatively, the phishing test engine may apply natural language processing (NLP) such that similar tone and/or sentiment (e.g., tonal scores or sentiment scores having differences that satisfy a difference threshold) in email messages may result in the email messages being mapped to a same cluster. Therefore, the subset of email messages may be identified because the subset is included in a single cluster of the plurality of clusters.

Figure 1B:
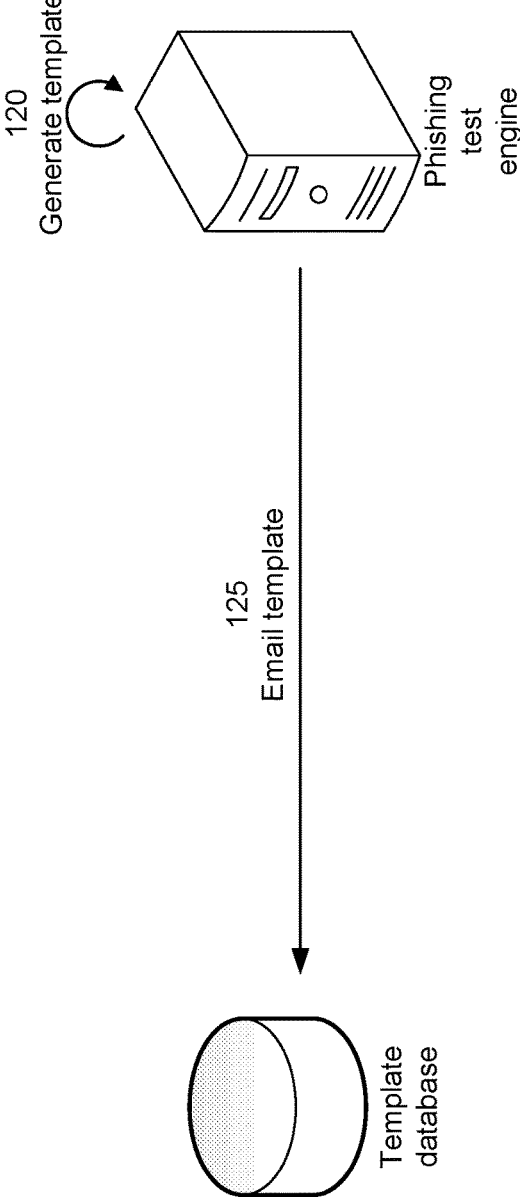

As shown in FIG. 1B and by reference number 120, the phishing test engine may generate an email template based on the subset of email messages. For example, the email template may include a saved email message (e.g., in an email message file with extension .eml, .emlx, .msg, or .mbx, among other examples) that includes placeholders (e.g., blank portions or portions with filler, such as asterisks or lorem ipsum) to be filled before sending. In some implementations, the phishing test engine may generate a plurality of email templates corresponding to the plurality of clusters (and/or a plurality of subsets out of the set of email messages). Therefore, the phishing test engine may generate different email templates based on different clusters of legitimate email messages (and thus for different clusters of users). For example, one email template may be associated with email messages from Capital One® and thus associated with users having an account at Capital One. In another example, one email template may be associated with email messages from store.com and thus associated with users that shop at store.com.

In some implementations, generating the email template may include determining a logo to include in the email template (e.g., extracted from a majority or another proportion of the subset of email messages), generating a subject line for the email template (e.g., by identifying words and phrases that are included in a majority or another proportion of the subset of email messages), and/or determining a layout for a body of the email template (e.g., by extracting HTTP and/or cascading style sheets (CSS) code from a majority or another proportion of the subset of email messages). Additionally, or alternatively, the phishing test engine may apply a machine learning model (e.g., similarly as described in connection with FIGS. 2A-2B), to the subset of email messages, to generate the email template. Accordingly, the machine learning model may output the email message file encoding the email template or may output elements of the email template (e.g., a logo, a subject line, and/or a layout, among other examples) that the phishing test engine may assemble into the email template (e.g., stored in an email message file).

Additionally, the phishing test engine may incorporate, into the email template, an indicator (e.g., at least one indicator) of phishing. For example, the indicator of phishing may include a suspicious hyperlink, a suspicious sender, or a suspicious phone number. The phishing test engine may insert a suspicious hyperlink that actually redirects to an educational webpage managed by, or at least associated with, the phishing test engine. Similarly, the phishing test engine may insert a suspicious phone number that actually redirects to an educational phone message recorded using, or at least associated with, the phishing test engine. Therefore, the email template may function as a phishing email message without actual risk of success. Although the example 100 describes the indicator of phishing as being incorporated separately, other examples may include the machine learning model incorporating the indicator of phishing during generation of the email template, as described above.

As shown by reference number 125, the phishing test engine may transmit the email template to the template database (e.g., for storage). The template database may include a local storage (e.g., a memory managed by the phishing test engine) and/or a storage that is at least partially separate (e.g., physically, logically, and/or virtually) from the phishing test engine. Therefore, the phishing test engine may transmit the email template to the template database (e.g., included in an HTTP request and/or using an API call) and receive a response from the template database (e.g., included in an HTTP response and/or as a return from the API call) confirming that the email template was stored. The phishing test engine may store the email template in association with an indicator of the subset of users (associated with the email template). For example, the email template may be associated with email messages from Capital One and thus may be stored in association with a string "Capital One" and/or an index assigned to Capital One, among other examples.

Figure 1C:
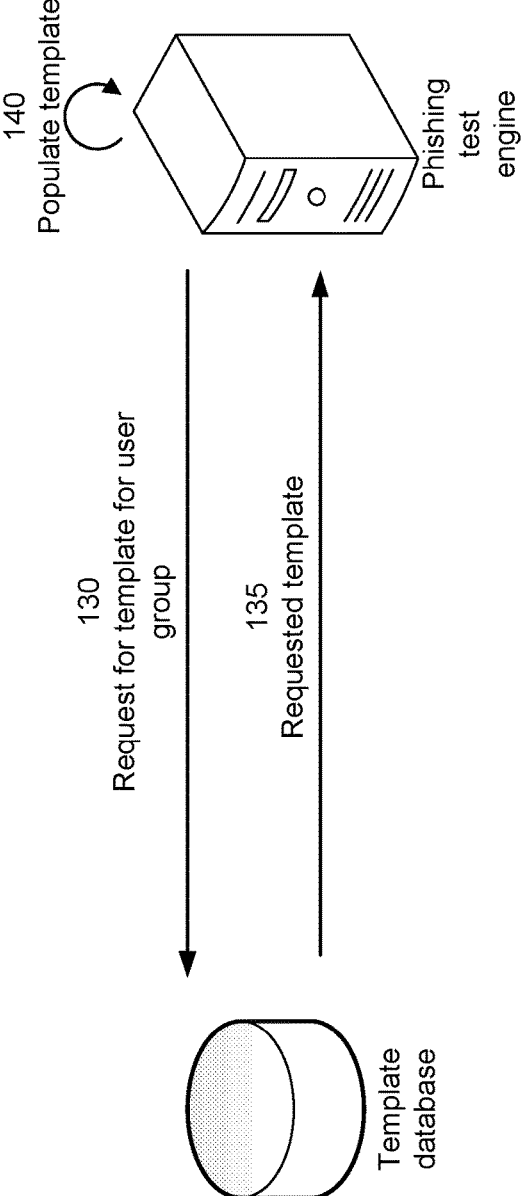

As shown in FIG. 1C and by reference number 130, the phishing test engine may transmit, and the template database may receive, a request for an email template associated with a user group. For example, the phishing test engine may transmit a query to the template database (e.g., included in an HTTP request and/or using an API call) including an indication of the user group and receive a response to the query (e.g., included in an HTTP response and/or as a return from the API call) that includes the email template. The indication of the user group may include a string, an index, or another data element associated with the user group. For example, the phishing test engine may include the string "Capital One" in the query in order to obtain the email template associated with email messages from Capital One. In some implementations, an administrator associated with the phishing test engine may provide input (e.g., via an input component) that triggers the phishing test engine to request the email template. Additionally, or alternatively, the phishing test engine may request the email template periodically (e.g., according to a schedule).

As shown by reference number 135, the template database may transmit, and the phishing test engine may receive, the requested email template. For example, the template database may transmit a response (e.g., included in an HTTP response and/or as a return from the API call) that includes the requested email template.

Accordingly, although the example 100 is shown with the phishing test engine both generating and using email templates, other examples may include a separate device (or system) generating the email templates. Accordingly, the phishing test engine may retrieve and use the email templates that were generated by the separate device (or system). In some implementations, the separate device (or system) may provide indications of user groups (e.g., strings, indices, or other data elements associated with the user groups) such that the phishing test engine may use the indications when requesting email templates from the template database.

The phishing test engine may generate, from the email template, a test email message (e.g., at least one test email message) addressed to a user (e.g., at least one user) in the subset of users. For example, as shown by reference number 140, the phishing test engine may populate the email template in order to generate the test email message.

In some implementations, the phishing test engine may select an email message (e.g., at least one email message) in the subset of email messages to populate the email template. The pushing test engine may select a most recent email message included in the cluster associated with the email template. For example, for an email template associated with email messages from Capital One, the phishing test engine may select a most recent email message associated with the user and included in a cluster of email messages associated with Capital One. In another example, for an email template associated with email messages from store.com, the phishing test engine may select a most recent email message associated with the user and included in a cluster of email messages associated with store.com. As a result, the email template is populated based on recent content, that the user received, associated with a same topic as the email template.

Populating the email template may include inserting content into a subject line of the test email message (e.g., inserting an alert category or a notification category, among other examples) based on the email message, in the subset of email messages and associated with the user, and/or inserting content into a body of the test email message (e.g., inserting an account number, an order number, a show name, a tracking number, or a conference name, among other examples) based on the email message in the subset of email messages and associated with the user. Additionally, or alternatively, the phishing test engine may extract a phrase, from a recent email message in the set of email messages and associated with the user, and may insert the phrase into a body of the test email message. For example, a recent email message associated with the user may include the phrase "order update" such that the phishing test engine inserts the phrase "order update" into the test email message. Additionally, or alternatively, the phishing test engine may select a phase, from a plurality of possible phrases, to include in the test email message, based on a recent email message in the set of email messages and associated with the user. For example, a recent email message associated with the user may include the phrase "order received" such that the phishing test engine inserts the phrase "order cancelled" or the phrase "order shipped" into the test email message (out of the plurality of possible phrases including "ordered received," "order cancelled," "order shipped," or "order arrived," among other examples). Additionally, or alternatively, populating the email template may include applying a machine learning model (e.g., as described in connection with FIGS. 2A-2B), to email messages associated with the user, to generate the test email message for the user.

The phishing test engine may repeat the processes described above in order to generate multiple test email messages addressed to multiple users. For each test email message, the phishing test engine may use a recent email message, associated with the user for whom the test email message is intended, to populate the email template.

Figure 1D:
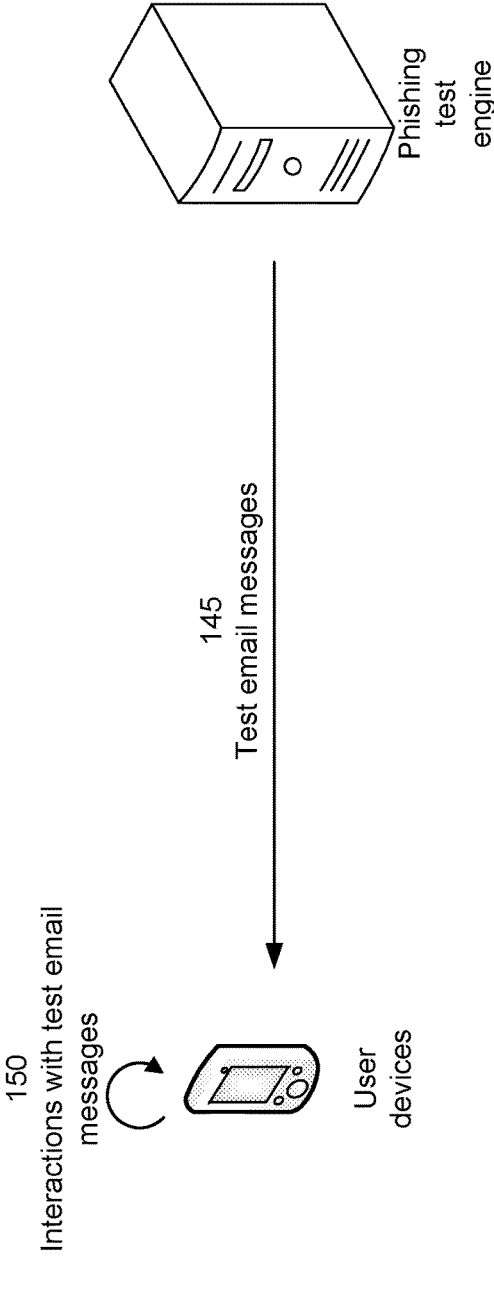

As shown in FIG. 1D and by reference number 145, the phishing test engine may transmit, and the user devices may receive, the test email messages. Although the example 100 is shown with the phishing test engine sending directly to the user devices, other examples may include the phishing test engine transmitting the test email messages to an email server (e.g., associated with outgoing email messages from the phishing test engine). For example, the email server may manage an email address (and/or account) associated with the phishing test engine (and/or with an administrator using the phishing test engine). Therefore, the user devices may receive the test email messages from email servers (e.g., one or more email servers) associated with incoming email messages to the user devices. For example, the email servers may manage email addresses (and/or accounts) associated with the user devices (and/or with users of the user devices).

As shown by reference number 150, the users of the user devices may interact with the test email messages. For example, the users may use input components (e.g., keyboards, mouses, touchscreens, and/or microphones, among other examples) to interact with user interfaces (UIs) (e.g., generated by email clients and/or another similar type of application executed by the user devices) output to the users (e.g., using output components, such as screens and/or speakers, among other examples) and including content of the test email messages. The interactions (e.g., one or more interactions) may include opening the test email messages, discarding the test email messages (e.g., into a deleted items folder, a trash folder, a junk folder, and/or a spam folder, among other examples), accessing a resource that is hyperlinked in the test email messages (e.g., following a uniform resource location (URL) included in the test email messages and/or viewing an image included in the test email messages), forwarding the test email messages, and/or replying to the test email messages.

Figure 1E:
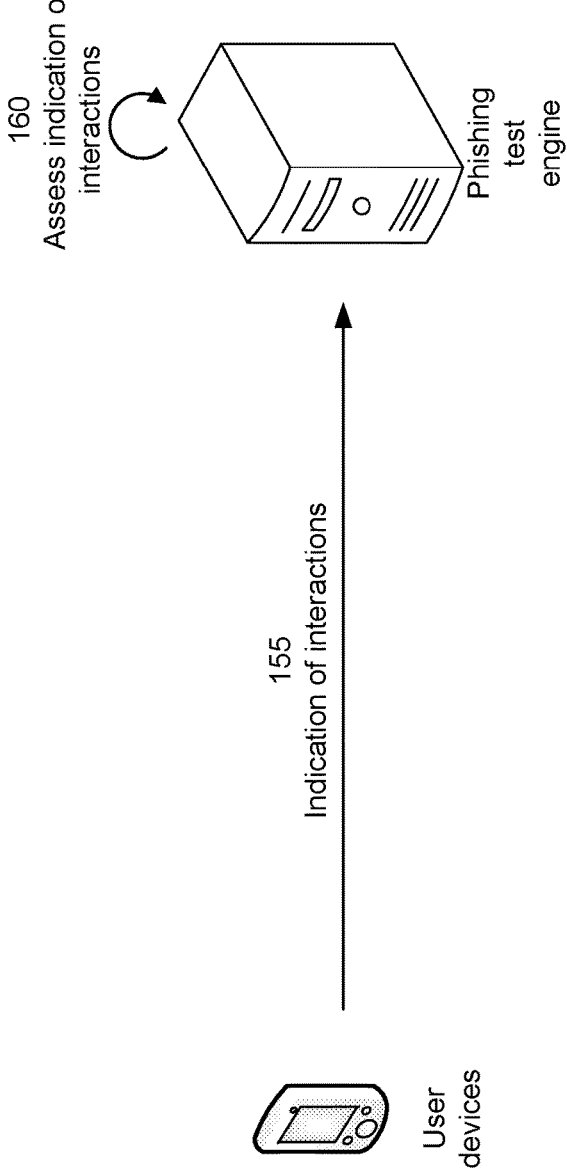

As shown in FIG. 1E and by reference number 155, the user devices may transmit, and the phishing test engine may receive, an indication of the interactions with the test email messages. Although the example 100 is shown with the user devices sending directly to the phishing test engine, other examples may additionally or alternatively include the user devices interacting with the test email messages such that an email server (e.g., associated with the user devices and/or the users of the user devices) and/or another external device or system (e.g., hosting content included in the test email messages, such as images) transmit the indication of the interactions. For example, a host for an image or a video in the test email messages may detect when the image or the video is downloaded or viewed by the user devices and may transmit an indication of the downloading or viewing to the phishing test engine. In another example, hypertext markup language (HTML) code or JavaScript® code in the test email messages may trigger a notification to the email server when the test email messages are opened, forwarded, or replied to, such that the email server may transmit an indication of the opening, forwarding, or replying to the phishing test engine. In another example, an external device hosting a target destination (e.g., a target Internet protocol (IP) address) associated with a hyperlink in the test email messages may log when the user devices access the target destination and may transmit an indication of the accessing to the phishing test engine.

As shown by reference number 160, the phishing test engine may assess the indication of the interactions. For example, the phishing test engine may generate a report for transmitting (e.g., as described in connection with reference numbers 165a and 165b). Additionally, or alternatively, the phishing test engine may map a category of the interactions to a training (e.g., from a plurality of possible trainings) for indication to the users (e.g., as described below). The phishing test engine may use a data structure (e.g., received from a local storage or a storage that is at least partially external to the phishing test engine) that stores categories of interactions (e.g., stored as strings, classes, or other similar types of data elements) in association with corresponding indications of the possible trainings (e.g., indices, alphanumeric indications, string names, or other similar types of data elements). For example, downloading multimedia in the test email messages may be associated with a training regarding refraining from downloading suspicious multimedia while clicking a hyperlink in the test email messages may be associated with a training regarding refraining from clicking suspicious links.

Additionally, or alternatively, the phishing test engine may update a trust score, associated with a sender, based on the indication of the interactions. For example, the test email messages may be associated with the sender (e.g., because the cluster associated with the email template used to generate the test email messages is also associated with the sender). Accordingly, based on the users clicking a hyperlink in the test email messages or downloading multimedia in the test email messages, the phishing test engine may reduce the trust score associated with the sender. On the other hand, based on the users forwarding the test email messages to a phishing report line, deleting the test email messages, or classifying the test email message as junk or spam, the phishing test engine may increase the trust score associated with the sender.

Figure 1F:
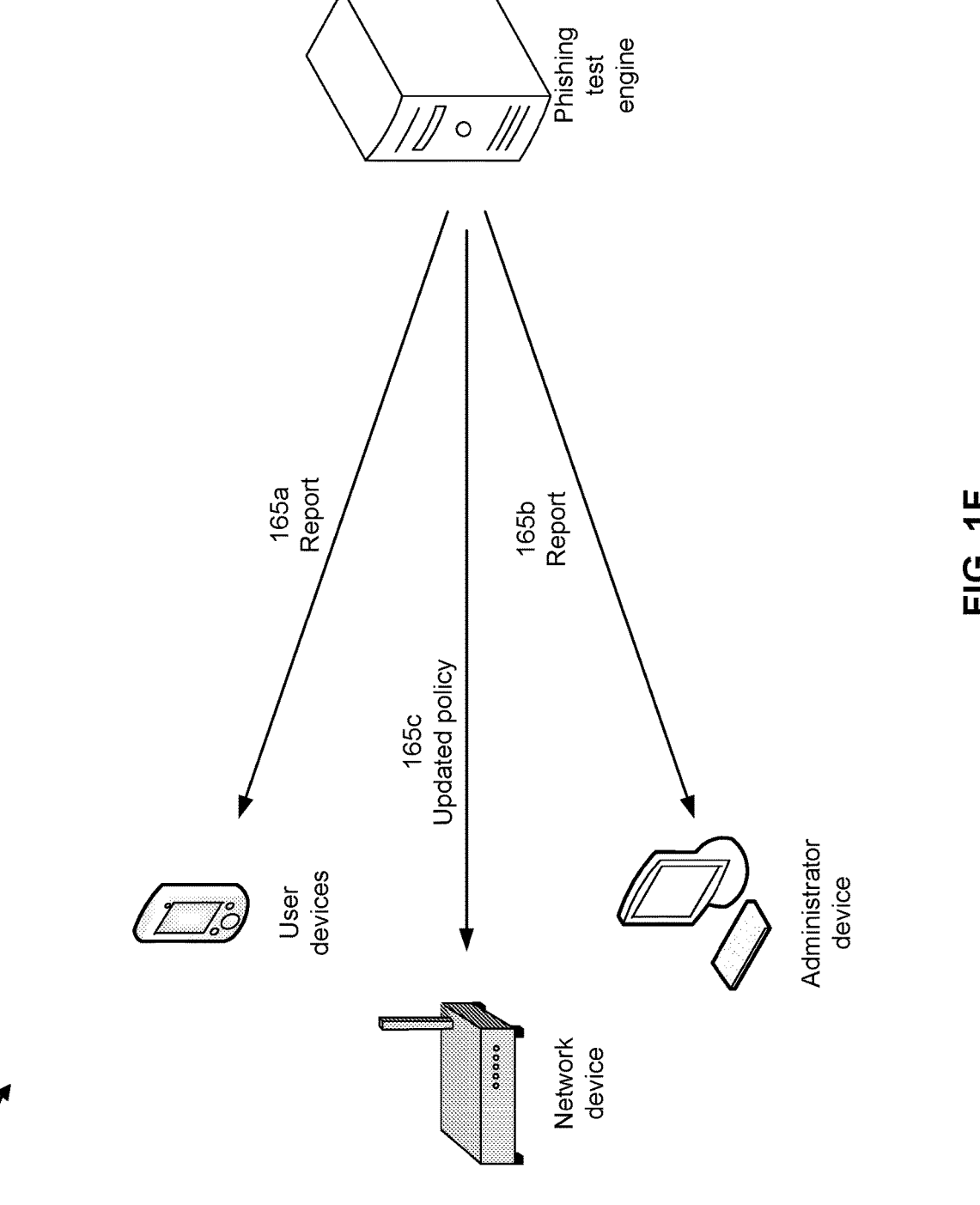

As shown in FIG. 1F and by reference number 165a, the phishing test engine may transmit, and the user devices may receive, a report based on the indication of the interactions. The report may include a portable document format (pdf), a Microsoft Word® document, or a spreadsheet, among other examples. The report may indicate which users, in the subset of users, interacted with the test email messages. Additionally, the report may indicate the interactions from the users. For example, the phishing test engine may determine a category for the interactions (e.g., positive interactions, such as forwarding the test email messages to a phishing report line, deleting the test email messages, or classifying the test email messages as junk or spam, as contrasted with negative interactions, such as clicking a hyperlink in the test email messages or downloading multimedia in the test email messages). Accordingly, the report may indicate the category in addition to, or in lieu of, expressly indicating the interactions.

Additionally, or alternatively, as shown by reference number 165b, the phishing test engine may transmit, and an administrator device may receive, a report based on the indication of the interactions. The report transmitted to the administrator device may be the same report as transmitted to the user devices or a different report than the report transmitted to the user devices. For example, the report transmitted to the administrator device may indicate the interactions from the users while each user device receives a report indicating an interaction from only a user associated with the user device.

In some implementations, the phishing test engine may additionally, or alternatively, select a training, from a plurality of possible trainings, based on the indication of the interactions. Accordingly, the phishing test engine may transmit a message, to the users of the user devices, indicating the selected training. For example, the message may include an email message, a text message, a pop-up window, a push notification, and/or another type of communication that includes a URL (or another type of hyperlink) to the selected training.

Additionally, or alternatively, as shown by reference number 165c, the phishing test engine may update a policy associated with the set of users based on the indication of the interactions. For example, the phishing test engine may instruct the network device to block the sender associated with the test email messages. In another example, the phishing test engine may instruct the network device to apply a label (e.g., a label indicating externality and/or suspiciousness) to future email messages from the sender associated with the test email messages. In some implementations, the policy may be updated based on the updated trust score (e.g., as described above). For example, in response to the trust score being decreased, the phishing test engine may determine to apply the label or to block the sender (e.g., when the label had previously been applied and the trust score decreased yet again). Although the example 100 describes the policy change as automatic, other examples may include the phishing test engine transmitting an indication of a recommended policy update to the administrator device and receiving a command to execute the recommended policy update from the administrator device in response. Therefore, the phishing test engine may update the policy in response to the command from the administrator device.

In some implementations, the network device may provision a firewall and/or an intranet on behalf of the organization including the set of users. Accordingly, the phishing test engine may additionally be associated with the organization such that the phishing test engine is authorized to modify the policy applied by the network device. Other examples may include the phishing test engine modifying a policy associated with a single user (e.g., applied at an email server that provisions an email address and inbox for personal use of the single user).

By using techniques as described in connection with FIGS. 1A-1F, the phishing test engine may generate phishing templates based on legitimate email messages. As a result, memory overhead is conserved as compared with using a database of extant phishing email messages. Additionally, the phishing test engine customizes the test email messages using recent email messages associated with the users, such that an educational value of the test phishing email messages is increased. Therefore, chances of successful phishing attacks are reduced, which conserves power and processing resources that would otherwise be expended on remediating the successful phishing attacks. In some implementations, the phishing test engine may automatically update the policy associated with the set of users based on results from the test phishing email messages, which may further reduce chances of successful phishing attacks.

As indicated above, FIGS. 1A-1F are provided as an example. Other examples may differ from what is described with regard to FIGS. 1A-1F.

Figure 2A:
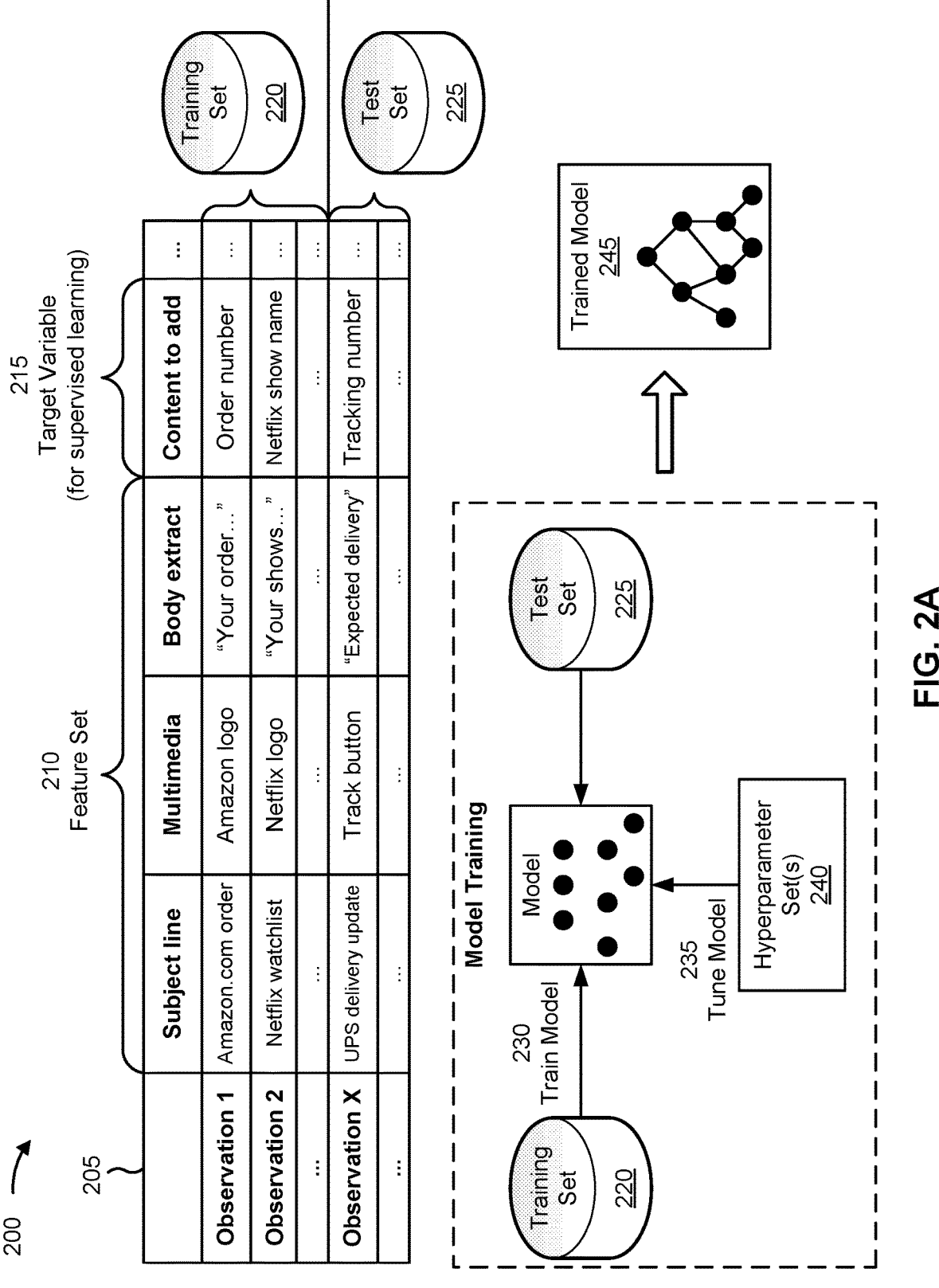
FIGS. 2A-2B are diagrams illustrating an example of training and using a machine learning model in connection with generating and deploying phishing templates, in accordance with some embodiments of the present disclosure.
Figure 2B:
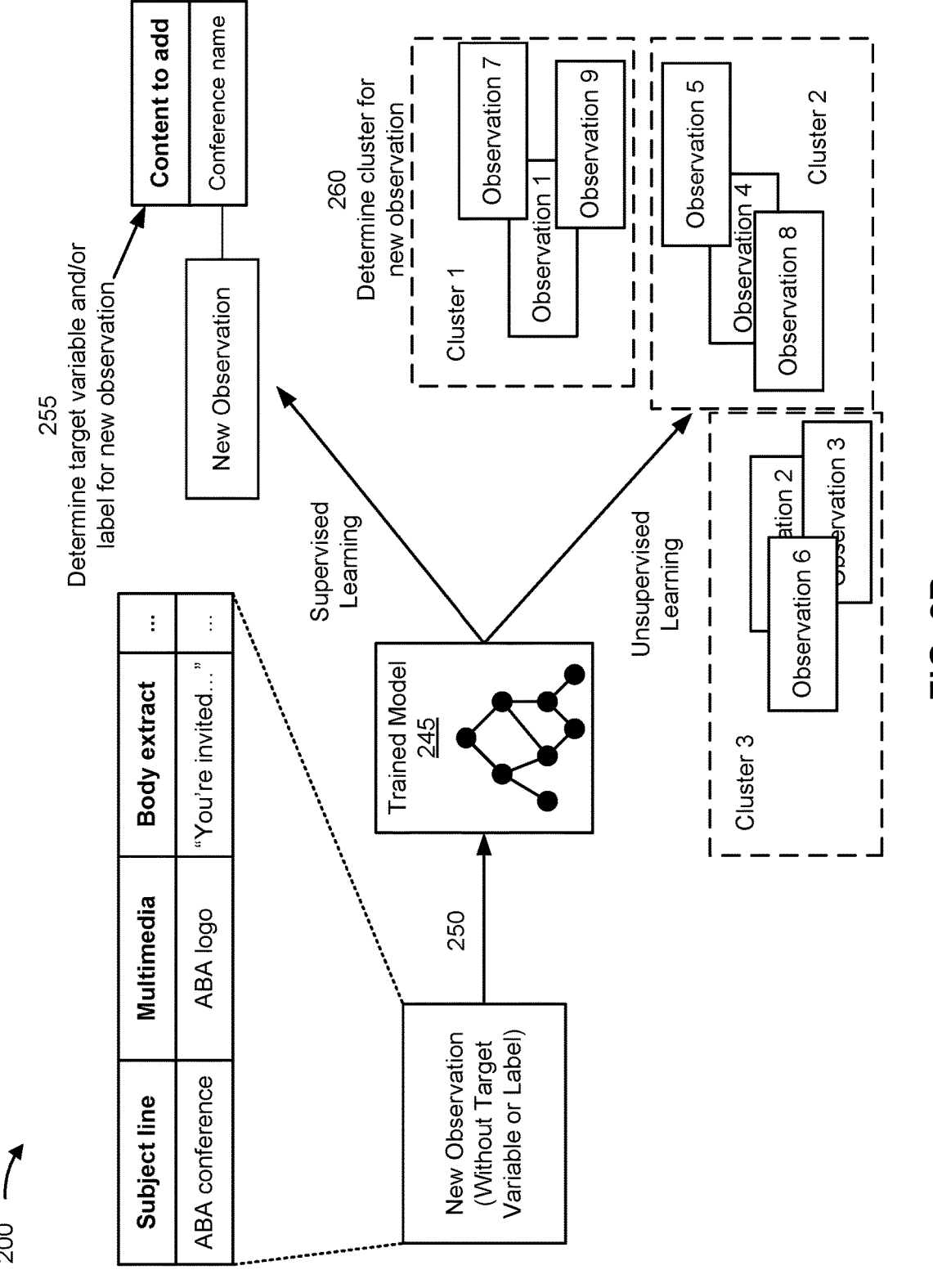

FIGS. 2A-2B are diagrams illustrating an example 200 of training and using a machine learning model in connection with generating and deploying phishing templates. The machine learning model training described herein may be performed using a machine learning system. The machine learning system may include or may be included in a computing device, a server, a cloud computing environment, or the like, such as the phishing test engine described herein.

As shown in FIG. 2A and by reference number 205, a machine learning model may be trained using a set of observations. The set of observations may be obtained and/or input from training data (e.g., historical data), such as data gathered during one or more processes described herein. For example, the set of observations may include data gathered from the email server, as described elsewhere herein. In some implementations, the machine learning system may receive the set of observations (e.g., as input) from the email server.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the email server. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a subject line, a second feature of multimedia (e.g., an image and/or a video), a third feature of an extract from a body, and so on. As shown, for a first observation, the first feature may have a value of "Amazon-.com order," the second feature may have a value of an Amazon logo, the third feature may have a value of "Your order," and so on. These features and feature values are provided as examples, and may differ in other examples. For example, the feature set may include one or more of the following features: a sender, a recipient, a carbon copy (CC) email address, a blind CC (BCC) email address, and/or a header value, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is content to add (e.g., to a test email message), which has a value of an order number for the first observation.

The feature set and target variable described above are provided as examples, and other examples may differ from what is described above. For example, the target variable may include an email template (e.g., a subject line, multimedia, and/or a layout for the template) and/or a cluster for an input email message (e.g., a cluster associated with store.com or a cluster associated with Capital One, among other examples).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that may include a first subset of observations, of the set of observations, and a test set 225 that may include a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 2B.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

FIG. 2B illustrates applying the trained machine learning model 245 to a new observation. As shown by reference number 250, the machine learning system may receive a new observation (or a set of new observations), and may input the new observation to the trained machine learning model 245. As shown, the new observation may include a first feature of "ABA conference," a second feature of an ABA logo, a third feature of "You're invited," and so on, as an example. The machine learning system may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 245 may predict a value of a conference name for the target variable of content to add for the new observation, as shown by reference number 255. Based on this prediction (e.g., based on the value having a particular label or classification or based on the value satisfying or failing to satisfy a threshold), the machine learning system may provide a recommendation and/or output for determination of a recommendation, such as a recommendation of the conference name to add to a test email message. Additionally, or alternatively, the machine learning system may perform an automated action and/or may cause an automated action to be performed (e.g., by instructing another device to perform the automated action), such as generating a test email message by inserting the conference name into an email template. As another example, if the machine learning system were to predict a value of a tracking number for the target variable of content to add, then the machine learning system may provide a different recommendation (e.g., a recommendation of the tracking number to add to a test email message) and/or may perform or cause performance of a different automated action (e.g., generating a test email message by inserting the tracking number into an email template). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 260. The observations within a cluster may have a threshold degree of similarity. As an example, if the machine learning system classifies the new observation in a first cluster (e.g., email messages associated with Capital One), then the machine learning system may provide a first recommendation, such as a recommendation for content to include in an email template for the first cluster. Additionally, or alternatively, the machine learning system may perform a first automated action and/or may cause a first automated action to be performed (e.g., by instructing another device to perform the automated action) based on classifying the new observation in the first cluster, such as generating an email template for the first cluster. As another example, if the machine learning system were to classify the new observation in a second cluster (e.g., email messages associated with store.com), then the machine learning system may provide a second (e.g., different) recommendation (e.g., a recommendation for content to include in an email template for the second cluster) and/or may perform or cause performance of a second (e.g., different) automated action, such as generating an email template for the second cluster.

In this way, the machine learning system may apply a rigorous and automated process to generating email templates and/or test email messages. The machine learning system may enable recognition and/or identification of tens, hundreds, thousands, or millions of features and/or feature values for tens, hundreds, thousands, or millions of observations, thereby increasing accuracy and consistency and reducing delay associated with generating email templates and/or test email messages relative to requiring computing resources to be allocated for a database of extant phishing emails to generate test email messages. For example, the memory overhead associated with the machine learning system is significantly less than the overhead associated with using a database of extant phishing emails.

As indicated above, FIGS. 2A-2B are provided as an example. Other examples may differ from what is described in connection with FIGS. 2A-2B. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
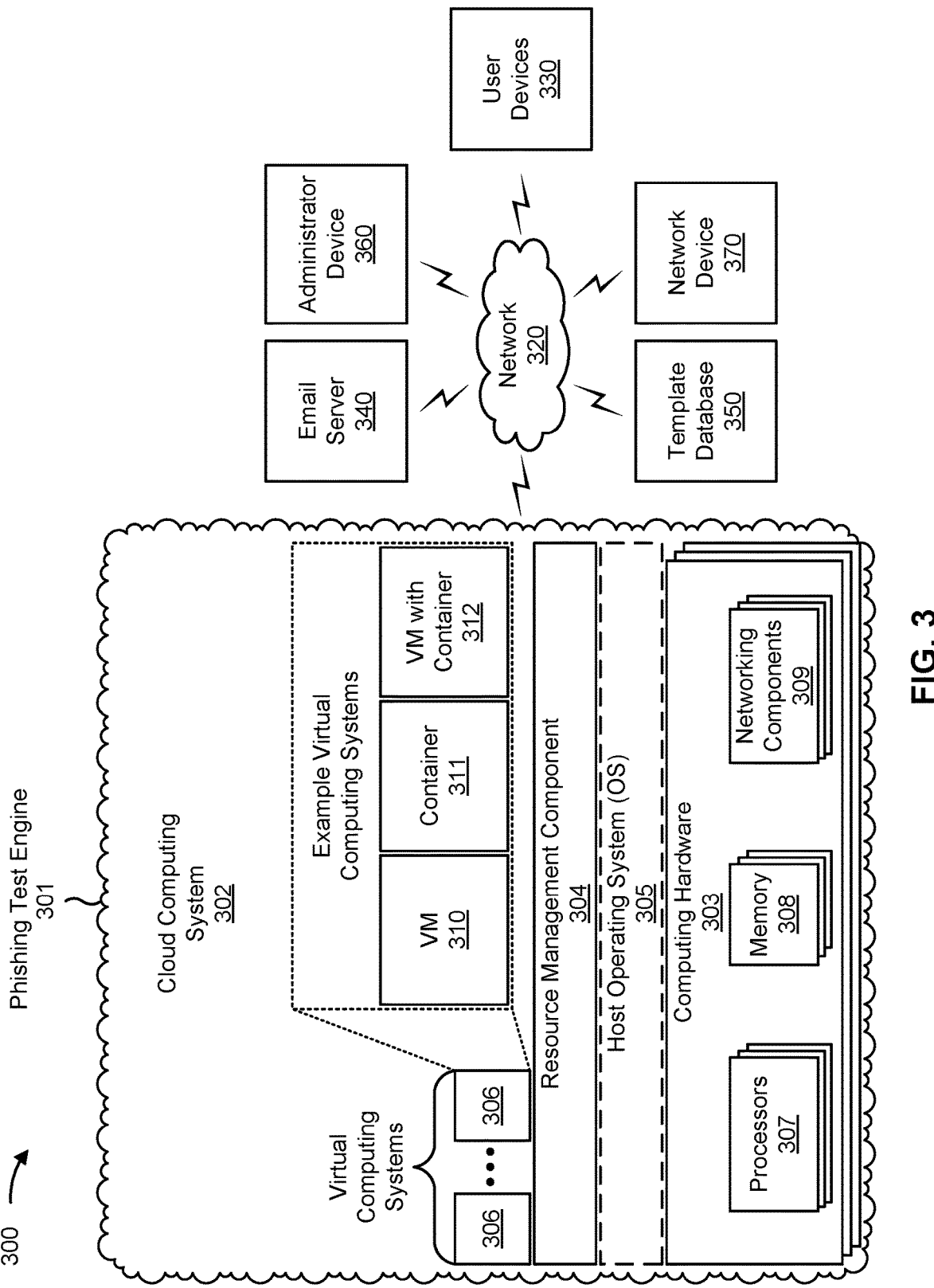
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a phishing test engine 301, which may include one or more elements of and/or may execute within a cloud computing system 302. The cloud computing system 302 may include one or more elements 303-312, as described in more detail below. As further shown in FIG. 3, environment 300 may include a network 320, user devices 330, an email server 340, a template database 350, an administrator device 360, and/or a network device 370. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the phishing test engine 301 may include one or more elements 303-312 of the cloud computing system 302, may execute within the cloud computing system 302, and/or may be hosted within the cloud computing system 302, in some implementations, the phishing test engine 301 may not be cloud-based (e.g., may be implemented outside of a cloud computing system) or may be partially cloud-based. For example, the phishing test engine 301 may include one or more devices that are not part of the cloud computing system 302, such as device 400 of FIG. 4, which may include a standalone server or another type of computing device. The phishing test engine 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user devices 330 may include devices capable of receiving, generating, storing, processing, and/or providing information associated with email messages, as described elsewhere herein. The user devices 330 may include a communication device and/or a computing device. For example, the user devices 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user devices 330 may communicate with one or more other devices of environment 300, as described elsewhere herein.

The email server 340 may include one or more devices capable of receiving, generating, storing, processing, and/or providing information associated with email messages, as described elsewhere herein. The email server 340 may include a communication device and/or a computing device. For example, the email server 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The email server 340 may communicate with one or more other devices of environment 300, as described elsewhere herein.

The template database 350 may be implemented on one or more devices capable of receiving, generating, storing, processing, and/or providing information associated with email templates, as described elsewhere herein. The template database 350 may be implemented on a communication device and/or a computing device. For example, the template database 350 may be implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device. The template database 350 may communicate with one or more devices of environment 300, as described elsewhere herein.

The administrator device 360 may include one or more devices capable of receiving, generating, storing, processing, and/or providing information associated with reports, as described elsewhere herein. The administrator device 360 may include a communication device and/or a computing device. For example, the administrator device 360 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 360 may communicate with one or more other devices of environment 300, as described elsewhere herein.

The network device 370 may include one or more devices capable of receiving, processing, storing, routing, and/or providing traffic (e.g., a packet and/or other information or metadata) in a manner described herein. For example, the network device 370 may include a router, such as a label switching router (LSR), a label edge router (LER), an ingress router, an egress router, a provider router (e.g., a provider edge router or a provider core router), a virtual router, or another type of router. Additionally, or alternatively, the network device 370 may include a gateway, a switch, a firewall, a hub, a bridge, a reverse proxy, a server (e.g., a proxy server, a cloud server, or a data center server), a load balancer, and/or a similar device. In some implementations, the network device 370 may be a physical device implemented within a housing, such as a chassis. In some implementations, the network device 370 may be a virtual device implemented by one or more computing devices of a cloud computing environment or a data center. In some implementations, a group of network devices 370 may be a group of data center nodes that are used to route traffic flow through a network (e.g., the network 320). The network device 370 may apply a policy as described herein. The network device 370 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
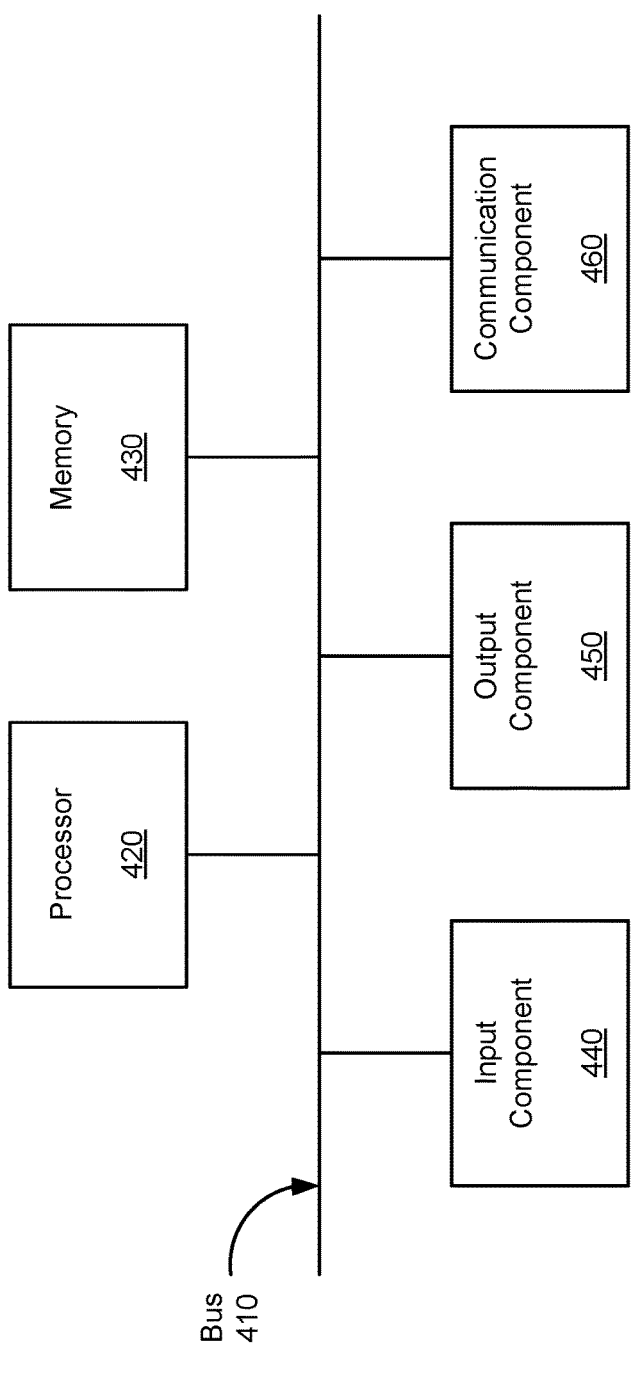
FIG. 4 is a diagram of example components of one or more devices of FIG. 3, in accordance with some embodiments of the present disclosure.

FIG. 4 is a diagram of example components of a device 400 associated with generating and deploying phishing templates. The device 400 may correspond to a user device 330, an email server 340, a device implementing a template database 350, an administrator device 360, and/or a network device 370. In some implementations, the user device 330, the email server 340, the device implementing the template database 350, the administrator device 360, and/or the network device 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with generating and deploying phishing templates. In some implementations, one or more process blocks of FIG. 5 may be performed by the phishing test engine. In some implementations, one or more process blocks of FIG. 5 may be performed by another device or a group of devices separate from or including the phishing test engine, such as the user device 330, the email server 340, a device implementing the template database 350, the administrator device 360, and/or the network device 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a set of email messages that are associated with a set of users (block 510). For example, the phishing test engine (e.g., using processor 420, memory 430, input component 440, and/or communication component 460) may receive a set of email messages that are associated with a set of users, as described above in connection with reference number 110 of FIG. 1A. As an example, the phishing test engine may transmit a request (e.g., an HTTP request and/or an API call, among other examples) to an email server and receive the set of email messages from the email server in response to the request (e.g., in an HTTP response and/or returned in response to an API call). The set of email messages may be associated with an indication of legitimacy or may include a combination of legitimate email messages and illegitimate email messages.

As further shown in FIG. 5, process 500 may include performing clustering on the set of email messages to identify a subset of similar email messages from the set of email messages and a subset of users from the set of users that are associated with the subset of similar email messages (block 520). For example, the phishing test engine (e.g., using processor 420 and/or memory 430) may perform clustering on the set of email messages to identify a subset of similar email messages from the set of email messages and a subset of users from the set of users that are associated with the subset of similar email messages, as described above in connection with reference number 115 of FIG. 1A. As an example, the phishing test engine may perform clustering using a machine learning algorithm (e.g., similarly as described in connection with FIG. 2B). Additionally, or alternatively, the phishing test engine may use matching words and/or phrases (e.g., identical strings or identifying strings with a matching proportion of characters that satisfies a matching threshold) in subject lines and/or bodies of email messages to sort the email messages in a same cluster. Additionally, or alternatively, the phishing test engine may apply NLP such that similar tone and/or sentiment (e.g., tonal scores or sentiment scores having differences that satisfy a difference threshold) in email messages may result in the email messages being mapped to a same cluster.

As further shown in FIG. 5, process 500 may include generating, for the subset of users, an email template based on the subset of similar email messages (block 530). For example, the phishing test engine (e.g., using processor 420 and/or memory 430) may generate, for the subset of users, an email template based on the subset of similar email messages, as described above in connection with reference number 120 of FIG. 1B. As an example, the phishing test engine may apply a machine learning model (e.g., similarly as described in connection with FIGS. 2A-2B), to the subset of similar email messages, to generate the email template.

As further shown in FIG. 5, process 500 may include incorporating, into the email template, at least one indicator of phishing (block 540). For example, the phishing test engine (e.g., using processor 420 and/or memory 430) may incorporate, into the email template, at least one indicator of phishing, as described above in connection with reference number 120 of FIG. 1B. The indicator of phishing may include a suspicious hyperlink, a suspicious sender, or a suspicious phone number. As an example, the phishing test engine may insert a suspicious hyperlink that actually redirects to an educational webpage managed by, or at least associated with, the phishing test engine. Similarly, the phishing test engine may insert a suspicious phone number that actually redirects to an educational phone message recorded using, or at least associated with, the phishing test engine.

As further shown in FIG. 5, process 500 may include generating, from the email template, a test email message addressed to at least one user in the subset of users and based on at least one email message in the subset of similar email messages (block 550). For example, the phishing test engine (e.g., using processor 420 and/or memory 430) may generate, from the email template, a test email message addressed to at least one user in the subset of users and based on at least one email message in the subset of similar email messages, as described above in connection with reference number 140 of FIG. 1C. As an example, the phishing test engine may insert content into a subject line of the test email message (e.g., inserting an alert category or a notification category, among other examples) based on the at least one email message and/or may insert content into a body of the test email message (e.g., inserting an account number, an order number, a show name, a tracking number, or a conference name, among other examples) based on the at least one email message.

As further shown in FIG. 5, process 500 may include transmitting the test email message to the at least one user (block 560). For example, the phishing test engine (e.g., using processor 420, memory 430, and/or communication component 460) may transmit the test email message to the at least one user, as described above in connection with reference number 145 of FIG. 1D. As an example, the phishing test engine may send the test email message directly to at least one user device associated with the at least one user. Alternatively, the phishing test engine may transmit the test email messages to a first email server (e.g., associated with outgoing email messages from the phishing test engine) for delivery to the at least one user device via the first email server or via a second email server (e.g., associated with incoming email messages for the at least one user).

As further shown in FIG. 5, process 500 may include receiving an indication of one or more interactions with the test email message (block 570). For example, the phishing test engine (e.g., using processor 420, memory 430, input component 440, and/or communication component 460) may receive an indication of one or more interactions with the test email message, as described above in connection with reference number 155 of FIG. 1E. As an example, the at least one user device may send the indication directly to the phishing test engine. Additionally, or alternatively, the at least one user may interact with the test email message such that an email server (e.g., associated with the at least one user device and/or the at least one user) and/or another external device or system (e.g., hosting content included in the test email messages, such as images) may transmit the indication.

As further shown in FIG. 5, process 500 may include transmitting a report based on the indication of the one or more interactions (block 580). For example, the phishing test engine (e.g., using processor 420, memory 430, and/or communication component 460) may transmit a report based on the indication of the one or more interactions, as described above in connection with reference number 165a and/or reference number 165b of FIG. 1F. As an example, the report may indicate the one or more interactions and/or may indicate a category associated with the one or more interactions. The phishing test engine may transmit the report to the at least one user device associated with the at least one user and/or to an administrator device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F and/or 2A-2B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

In some implementations, an individual processor may perform all of the functions described as being performed by the one or more processors. In some implementations, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more processors described herein. Reference to "one or more memories" should be understood to refer to any one or more memories described herein. For example, functions described as being performed by one or more memories can be performed by the same subset of the one or more memories or different subsets of the one or more memories.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A system for generating and deploying phishing templates, the system comprising:
   one or more memories; and
   one or more processors, coupled to the one or more memories, configured to:
      receive a set of email messages that are associated with a set of users and that are associated with an indication of legitimacy;
      perform clustering on the set of email messages to identify a subset of similar email messages from the set of email messages and a subset of users from the set of users that are associated with the subset of similar email messages;
      generate, for the subset of users, an email template based on the subset of similar email messages;
      incorporate, into the email template, at least one indicator of phishing;
      generate, from the email template, a test email message addressed to at least one user in the subset of users and based on at least one email message in the subset of similar email messages;
      transmit the test email message to the at least one user;
      receive an indication of one or more interactions with the test email message;
      determine, based on the indication, a category for the one or more interactions, wherein the category is associated with a positive or negative interaction with the test email message; and
      transmit a report based on the category.

2. The system of claim 1,
   wherein the indication of legitimacy is associated with junk or spam.

3. The system of claim 1,
   wherein the one or more processors, to generate the email template, are configured to perform at least one of:
      determine a logo to include in the email template;
      generate a subject line for the email template; or
      determine a layout for a body of the email template.

4. The system of claim 1,
   wherein the one or more processors, to generate the test email message, are configured to perform at least one of:
      insert content into a subject line of the test email message based on at least one email message, in the subset of similar email messages, associated with the at least one user; or
      insert content into a body of the test email message based on the at least one email message associated with the at least one user.

5. The system of claim 1,
   wherein the one or more processors are configured to:
      update a trust score, associated with a sender, based on the indication of the one or more interactions.

6. The system of claim 1,
   wherein the one or more interactions include opening the test email message, discarding the test email message, accessing a resource that is hyperlinked in the test email message, or replying to the test email message.

7. The system of claim 1,
   wherein the at least one indicator of phishing includes a suspicious hyperlink, a suspicious sender, or a suspicious phone number.

8. The system of claim 1, wherein the one or more processors, to transmit the report, are configured to perform at least one of:

transmit the report to the at least one user; or transmit the report to an administrator associated with the set of email messages.

9. A method, comprising:

receiving a set of email messages that are associated with a set of users and that are associated with an indication of legitimacy;

performing clustering on the set of email messages to identify a subset of similar email messages from the set of email messages and a subset of users from the set of users that are associated with the subset of similar email messages;

generating, for the subset of users, an email template based on the subset of similar email messages;

incorporating, into the email template, at least one indicator of phishing;

generating, from the email template, a test email message addressed to at least one user in the subset of users and based on at least one email message in the subset of similar email messages;

transmitting the test email message to the at least one user;

receiving an indication of one or more interactions with the test email message;

determining, based on the indication, a category for the one or more interactions, wherein the category is associated with a positive or negative interaction with the test email message; and transmitting a report based on the category.

10. The method of claim 9, wherein the indication of legitimacy is associated with junk or spam.

11. The method of claim 9, wherein generating the email template comprises:

determining a logo to include in the email template;

generating a subject line for the email template; or determining a layout for a body of the email template.

12. The method of claim 9, wherein generating the email template comprises:

inserting content into a subject line of the test email message based on at least one email message, in the subset of similar email messages, associated with the at least one user; or inserting content into a body of the test email message based on the at least one email message associated with the at least one user.

13. The method of claim 9, further comprising:

updating a trust score, associated with a sender, based on the indication of the one or more interactions.

14. The method of claim 9, wherein the one or more interactions include opening the test email message, discarding the test email message, accessing a resource that is hyperlinked in the test email message, or replying to the test email message.

15. The method of claim 9, wherein the at least one indicator of phishing includes a suspicious hyperlink, a suspicious sender, or a suspicious phone number.

16. The method of claim 9, wherein transmitting the report comprises:

transmitting the report to the at least one user; or transmitting the report to an administrator associated with the set of email messages.

17. A non-transitory computer-readable medium storing a set of instructions for generating and deploying phishing templates, the set of instructions comprising:

one or more instructions that, when executed by one or more processors of a device, cause the device to:

receive a set of email messages that are associated with a set of users and that are associated with an indication of legitimacy;

perform clustering on the set of email messages to identify a subset of similar email messages from the set of email messages and a subset of users from the set of users that are associated with the subset of similar email messages;

generate, for the subset of users, an email template based on the subset of similar email messages;

incorporate, into the email template, at least one indicator of phishing;

generate, from the email template, a test email message addressed to at least one user in the subset of users and based on at least one email message in the subset of similar email messages;

transmit the test email message to the at least one user;

receive an indication of one or more interactions with the test email message;

determine, based on the indication, a category for the one or more interactions, wherein the category is associated with a positive or negative interaction with the test email message; and transmit a report based on the category.

18. The non-transitory computer-readable medium of claim 17, wherein the indication of legitimacy is associated with junk or spam.

19. The non-transitory computer-readable medium of claim 17, wherein the one or more instructions, when executed, further cause the device the one or more processors of the device to:

update a trust score, associated with a sender, based on the indication of the one or more interactions.

20. The non-transitory computer-readable medium of claim 17, wherein the at least one indicator of phishing includes a suspicious hyperlink, a suspicious sender, or a suspicious phone number.

* * * * *